D. F. COMSTOCK.
PRODUCTION OF COMPLEMENTAL IMAGES.
APPLICATION FILED SEPT. 25, 1916.

1,280,667.  Patented Oct. 8, 1918.

Inventor:
Daniel F. Comstock,
by Roberts Roberts & Cushman
His Attorneys.

UNITED STATES PATENT OFFICE.

DANIEL F. COMSTOCK, OF BROOKLINE, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

PRODUCTION OF COMPLEMENTAL IMAGES.

1,280,667.      Specification of Letters Patent.      Patented Oct. 8, 1918.

Application filed September 25, 1916. Serial No. 121,931.

*To all whom it may concern:*

Be it known that I, DANIEL F. COMSTOCK, a citizen of the United States, and resident of Brookline, in the county of Norfolk and State of Massachusetts, have invented new and useful Improvements in the Production of Complemental Images, of which the following is a specification.

This invention relates to the production of undistorted multiple images, and more particularly the invention relates to a compound lens system of a multiplex motion-picture camera for simultaneously forming, accurately in the same plane, two or more substantially perfect complemental images of a scene, the complemental images being formed from the same point of view.

In color motion-picture projection it has heretofore been the commercial practice to project successively through color-screens, film pictures taken successively through color-screens. The results obtained by this method have been open to two serious objections: first, the displacements in successive pictures of moving objects cause those parts of the moving objects, which do not coincide in the successive pictures, to appear in the colors of the several color-screens rather than in the natural colors which would result from the blending or fusion of the several colors; secondly, the eye is fatigued by the alternate bombardment of light of different colors. The first difficulty causes what are called "fringes" and is especially bad when rapidly moving objects are photographed. The second difficulty causes a feeling of eye strain which is distinctly objectionable.

To overcome this, it is desirable to project simultaneously through different color-screens two or more photographs, taken through color-screens, of the same scene from accurately the same point of view at the same time. This involves the problem of obtaining on a film or films two or more photographs from accurately the same point of view, of the same scene at the same time. In the production of complemental pictures for color motion-picture projection it is not only essential to free each individual picture from aberrations owing to the high degree of magnification employed in the projection of the picture upon a screen, but it is of equally great importance to correct each picture in the same manner and to the same degree; otherwise, when the complemental pictures are projected upon a screen, either simultaneously or successively, the respective images will not coincide and decidedly objectionable blurring and equally objectionable fringing of colors results.

The problem of obtaining two or more color images of the same scene from the same point of view at the same time through the same lens system for the motion picture film, is complicated by numerous practical difficulties. In general, it involves dividing the light into two or more similar but separate beams, and reflecting the divided beams upon the film in the film-gate or other film positioning means, and so reflecting the light throughout the system, that clear images appear in the plane of the film. The more obvious ways of doing this are, for various reasons, unsuitable for the motion picture field.

For example, an ordinary photographic objective may constitute the entire lens system, and some form of polished metallic grid, with reflectors of similar type, may be used to divide and to reflect the beams so that clear images fall in the plane of the film. Such a system is markedly unsatisfactory for two reasons. In the first place, the surface of the metal grid and reflectors easily becomes oxidized, tarnished, mechanically injured, or covered with a deposit of dust or other foreign substance which cannot readily be removed without mechanically injuring the surface; and even when such mirrors are not visibly damaged by any of the above means, they may still have their coefficients of reflection markedly changed through the lapse of even short spaces of time. The deterioration of metallic reflecting surfaces may seem a trivial difficulty, but it has been found impossible in practice to use such reflectors successfully for camera work.

If the metallic surface is protected by a plate of glass, it is clear that the front surface of the glass will also reflect light, and so-called "ghosts" will make their appearance on the film. On the other hand, if thin layers of lacquer, or similar substance, are used to protect surfaces, their protecting influence is found to be less than might be imagined, as they are all more or less porous or permeable and consequently do not protect the surface adequately. Such substances are likewise soft and easily abraded. Again, if such metallic mirrors are used, it will in general be found that the mounting of them and the means necessary for adjustment will require a considerable increase in the length of path above the length which would appear necessary on a simple geometric diagram.

The second objection to the use of such a system is based upon the fact that it is highly advisable, for reasons of perspective, size of picture, depth of focus, etc., that whatever lens system is used in motion picture work should in general have a relatively short equivalent focal length; and this means, of course, that if an ordinary photographic objective constitutes the entire lens system, it must be at a relatively short distance measured along the light rays, from the film. It will be found in general that short focal lengths are prohibited when such a metallic system is used, because of the space required in getting the light divided and reflected to form separate images.

There remains the possibility of using right-angle prisms with silvered or totally reflecting surfaces, simply mounting one of these wherever the light is to be reflected. The difficulty here encountered is that each of the surfaces where the light enters and leaves the prisms reflects light, and, according to the particular structure used, the stray light falling on the image due to such reflections, will be more or less pronounced. The difficulty of mounting and adjusting also applies to this case.

The object of this invention therefore, is to provide a method of and apparatus for simultaneously producing, accurately of the same size and preferably in the same plane, a plurality of complemental images of an object field, taken simultaneously from the same point of view; and for producing the complemental images in such manner that they are substantially identical and substantially free from astigmatism, spherical and chromatic aberrations, whereby the images, when projected in superposed relation upon a screen may be accurately registered throughout.

In the face of the above difficulties the present invention follows markedly radical lines. It abandons polished metal mirrors, and abandons the ordinary photographic objective as constituting its lens system. It involves filling the entire dividing and reflecting system with a transparent medium as optically dense as practicable. Such a light dividing, reflecting and refracting medium comprises a generalized lens component and is hereinafter referred to as the composite component. But like any other uncorrected component, it renders imperfect any perfect image transmitted through it. Through shaping the surfaces where the light enters and leaves the composite component, it is possible to reduce the aberrations in such a transmitted image, but in general they will not in this way be completely removable.

In order to obtain real images and have them reasonably perfect, a specially designed positive lens component must be combined with the composite component. This positive component must be so proportioned that the resultant lens as a whole is a relatively perfect positive lens with its rear nodal point at a proper distance from the film. Indeed, it can be shown that the rear nodal point in our improved system is nearer the image plane than the forward surface of the composite element, i. e., that the rear nodal point of the system is within the composite element. Therefore, since as far as the image is concerned, the resultant lens system is virtually situated at its rear nodal point, the equivalent focal length of the system is markedly shorter than the shortest focal length which can be used if the reflecting, dividing region is not filled with the optically dense medium.

My composite lens system satisfactorily meets the difficulties above enumerated. Such metal surfaces as are necessary are coated on a surface of glass, which surface, since it is simply the boundary of the dense medium itself, involves no ghosts and serves as an adequate protection for the metal film itself. Moreover, the possibility of having the rear nodal point of the entire lens system within the composite element itself removes largely or entirely the length-of-path difficulty.

In the accompanying drawings,—

Figure 1:
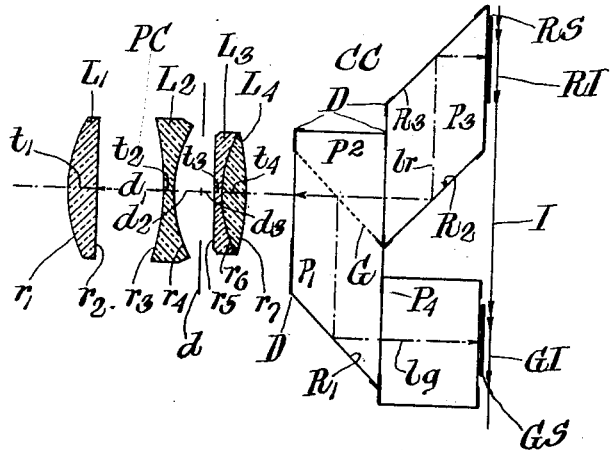
Figure 1 is one embodiment of my invention showing one combination of positive and composite components of the lens system.

In each of the figures the positive component of the lens system is designated as PC and the composite component is designated as CC. The positive component is somewhat similar to the ordinary camera objective but is designed in such manner as to adapt it to form in combination with the composite component, a spherically, chromatically, and astigmatically corrected lens system. In each embodiment the light from the object field enters the lens system from the left, is formed into an image-bearing beam the size of which is controlled by the diaphragm $d$, and thence passes to the composite component where it is divided into a plurality of similar image-bearing beams which are projected into the image plane I, preferably in spaced relationship with respect to each other.

The composite component CC comprises a plurality of glass prisms $P_1$, $P_2$, $P_3$ and $P_4$, cemented together as shown, the prisms $P_1$ and $P_3$ consisting of 45° rhombs, $P_2$ consisting of a 45° triangular prism, and $P_4$ consisting of a plane-parallel block. Between the prisms $P_1$ and $P_2$ is arranged a light-dividing means which preferably comprises a grid designed according to the invention disclosed in my Patent No. 1,231,710 granted July 3, 1917, which, in two-color apparatus such as illustrated in the drawings, is adapted respectively to transmit and to reflect one-half of the image-bearing beam. The faces $R_1$, $R_2$ and $R_3$ of the prisms $P_1$ and $P_3$ are arranged to function, respectively, as total reflecting surfaces for the reflected and transmitted portions of the image-bearing beam. Color screens which, for example, may comprise a red screen R S and a green screen GS, are placed in the paths of the respective image-bearing beams between the rear faces of the prisms and the image plane I for transmitting only the components of the light which have the desired dominant hues. Dams D of black balsam are preferably placed at the proper positions to cut off stray reflections and thereby avoid the formation of "ghosts" on the film.

As will be hereinafter more fully explained, an important feature of the composite component consists in making the paths of the complemental image-bearing beams therein of substantially the same length, the length of the paths being measured along the ray passing through the center of the positive component, along the axis of the positive component, and along the central rays of the separate beams which pass through the center of the respective complemental images; that is, making the distances along the dot and dash lines from the grid G, where the main image-bearing beam is divided, to the rear faces of the prisms $P_3$ and $P_4$, substantially equal.

In accordance with the principal object of the invention, the lens system comprising the two elements of the character described is very carefully corrected for the following aberrations, namely, primary curvature of field, secondary curvature of field, spherical aberration, axial chromatic aberration, oblique chromatic aberration, coma, etc. In color motion-picture photography for which the lens system is particularly adapted, it is desirable that these aberrations be either wholly eliminated or at least that they be reduced to such an extent that no blur is produced which has a diameter greater than 1/800 of an inch at the center of the image or which has a diameter greater than 1/400 of an inch at a point one-half inch from the center of the image. Each modification of the invention herein disclosed will produce images having aberrations, if any, which are within these limits.

The aberrations may be partially corrected by providing the prisms with convex or concave surfaces in the paths of the image-bearing beams, or by making the paths of the complemental image-bearing beams of slightly different lengths; or, the correction of the aberrations of the entire system may be made wholly in the positive element, that is, the positive element may be designed in such a way that when used in combination with the composite element, the aberrations of the entire system will be corrected without curving the faces of the prisms and without making the paths through the prisms of unequal length.

One system of the type in which the positive component is specially designed to correct the aberrations of the entire lens system, comprises the positive component PC and the composite component CC, illustrated in Fig. 1. The positive component is of the general type having four single lenses arranged in two groups, the two groups being separated by the diaphragm. The two elements of one group are separated by an air space while the two elements of the other group are cemented together. The pair of facing surfaces have a negative power while the pair of cemented surfaces have a collective effect. This results in the positive component having a comparatively small number of lenses, thereby reducing reflections, affording a relatively large aperture and affording a relatively large area of anastigmatic flatness of field. Of the four lenses of the composite component PC the lenses $L_1$ and $L_2$ are positive and the lenses $L_3$ and $L_4$ are negative. The group $L_1$, $L^2$ is separated from the group $L_3$, $L_4$, by a diaphragm $d$. The lenses $L_1$, $L_2$, are separated by an air space bounded by facing surfaces which have a dispersive effect and the lenses $L_3$, $L_4$, are joined by a cemented surface having a collective effect. The data for the lens system comprising the components PC and CC are as follows:

*Positive component.*

$r_1 = +0.835$
$t_1 = 0.158$  $n_D = 1.6120$  $n_G' = 1.6253$  C—F$= 0.01045$
$r_2 = \pm \infty$
$d_1 = 0.350$
$r_3 = -1.340$
$t_2 = 0.047$  $n_D = 1.6128$  $n_G' = 1.6347$  C—F$= 0.01657$
$r_4 = +0.701$
$d_2 = 0.185$
$d_3 = 0.043$
$r_5 = +11.34$
$t_3 = 0.035$  $n_D = 1.5267$  $n_G' = 1.5395$  C—F$= 0.01002$
$r_6 = +0.689$
$t_4 = 0.161$  $n_D = 1.6135$  $n_G' = 1.6274$  C—F$= 0.01100$
$r_7 = -1.205$
Focal length$= 3.06$. Aperture ratio$= 1 : 3.9$

*Composite component.*

$l_g = 2.70$
$l_r = 2.70$  $n_D = 1.5730$  $n_G' = 1.5857$  C—F$= 0.00995$

In the above table of data as well as in the two tables hereinafter set forth, all dimensions are in inches and the various characters have the following significance: $r_1$ $r_2$, etc., refer to the radii of curvature of the various lens surfaces; $t_1$, $t_2$, etc., represent the thicknesses of the lenses; $d_1$, $d_2$, etc., represent the distances between the adjacent surfaces of the lenses and between the lenses and diaphragms; $l_r$ and $l_g$ represent the lengths of the paths of the component beams in the prisms; $n_D$, $n_G$, represent the refractive indices of the glasses used for D-light and G'-light, respectively; and C—F is the dispersive values of the lenses for the range of light between the C and F lines of the spectrum. Although data are given for only one focal length in connection with each embodiment of the invention, it is to be understood that data for systems for other focal lengths may be derived by making proportional changes for all dimensions involved. Furthermore, the data are based upon systems in which the dense medium comprising the composite component has an index of refraction for D-light of 1.573 and a dispersive value of .00995 for C—F light, although the data are substantially accurate for a considerable range of optical media.

Figure 2:
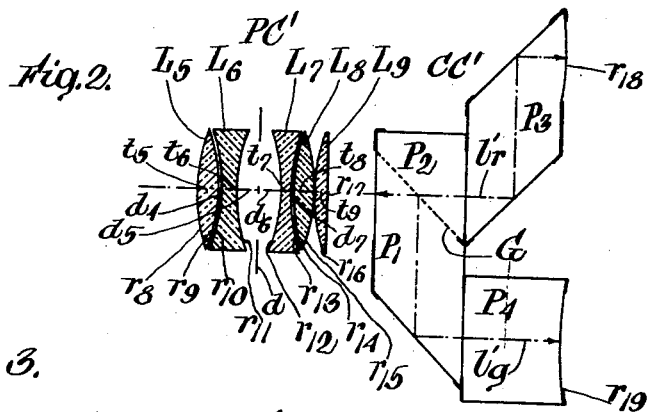
Fig. 2 is another embodiment of the invention showing a different type of positive lens in combination with the composite component.

In the embodiment of the invention shown in Fig. 2 the positive component PC' is distinctly different from the positive component PC, illustrated in Fig. 1. This component comprises two groups of lenses, the forward group of which comprises a positive lens $L_5$ and a negative lens $L_6$, and the rearward group of which comprises a negative lens $L_7$, a positive lens $L_8$, and a positive lens $L_9$. Each of the positive lenses $L_5$ and $L_8$ is composed of highly refractive barytcrown glass and the negative lenses $L_6$ and $L_7$ are composed of glass having a low refractive power, the two groups of lenses being separated by an air space of positive meniscus form. The respective surfaces of each of the two negative lenses $L_6$ and $L_7$ preferably have different degrees of curvature, and the lenses are preferably so arranged with respect to the diaphragm that the surface of the negative lens of the front group which has the greater degree of curvature faces the diaphragm, and so that the surface of the negative lens of the rear group having the lesser degree of curvature faces the diaphragm. It is also preferable that the forward group of lenses should have a focal length greater than the focal length of the rear group, but that the focal length of the forward group should not exceed approximately twice the focal length of the rear group. The positive lens $L_9$ preferably has a focal length substantially three times the focal length of the entire positive component PC'. The lens may be planoconvex; or indeed, the surface facing the composite component CC' may even be weakly positive, but preferably the lens is of positive meniscus form having a surface of negative curvature facing the composite component. The lens $L_9$ is made of glass having a low dispersive power, for example, a glass with a refractive index for D-light of 1.5116 and whose mean dispersive power is 1/60.3.

Fig. 2 also illustrates means whereby the separate divided beams may each be further corrected individually. This comprises making the faces of the prisms in the paths of the separate beams concave and convex, respectively, the face of the prism $P_3$ which is in the path of the beam intended to form the red image being made convex, while the face of the prism $P_4$ which is in the path of the beam intended to form the green image is made concave. These curvatures may or may not be employed and, when they are employed, they serve as means for further correcting the oblique chromatic aberration of the lens system. In the particular embodiment of the invention, illustrated in Fig. 2, the curvature of the surfaces of the respective prisms should differ by approximately 1.25 diopters, and while each surface is illustrated as having a curvature of half this amount, the surface of prism $P_3$ having a positive curvature of 0.625 diopters and the surface of prism $P_4$ having a negative curvature of 0.625 diopters. it is to be understood that the difference of curvature of 1.25 diopters might be divided in any other desired manner; and indeed, the entire curvature might be applied to one prism leaving the face of the other prism flat. When the faces of the prism are curved for the purpose of further correcting the oblique chromatic aberration, the prisms must be fixed in position with respect to the image plane, whereas this condition is not essential when the faces of the prisms are not curved, as in Fig. 1. In either event, as well as in the embodiment illustrated in Fig. 3, the positive component need not be maintained in any particular fixed relationship with respect to the composite component of the system.

The data for the specific embodiment of the invention illustrated in Fig. 2 are as follows:

*Positive component.*

$r_8 = +1.090$
$\quad t_6 = 0.165 \quad n_D = 1.6141 \quad n_{G'} = 1.6280 \quad G-F = 0.01090$
$r_9 = +4.058$
$\quad d_4 = 0.071$
$r_{10} = -2.122$
$\quad t_6 = 0.063 \quad n_D = 1.5689 \quad n_{G'} = 1.5864 \quad C-F = 0.01335$
$r_{11} = -1.485$
$\quad d_5 = 0.122$
$\quad d_6 = 0.091$
$r_{12} = -2.492$
$\quad t_7 = 0.063 \quad n_D = 1.5482 \quad n_{G'} = 1.5636 \quad C-F = 0.01188$
$r_{13} = -1.381$
$\quad d_7 = 0.071$
$r_{14} = +2.094$
$\quad t_8 = 0.142 \quad n_D = 1.6141 \quad n_{G'} = 1.6280 \quad C-F = 0.01090$
$r_{15} = +1.405$
$r_{16} = +3.022$
$\quad t_9 = 0.075 \quad n_D = 1.5116 \quad n_{G'} = 1.5225 \quad C-F = 0.00839$
$r_{17} = -12.09$
Focal length = 2.77″. Aperture ratio = 1:3.5

*Composite component.*

Figure 3:
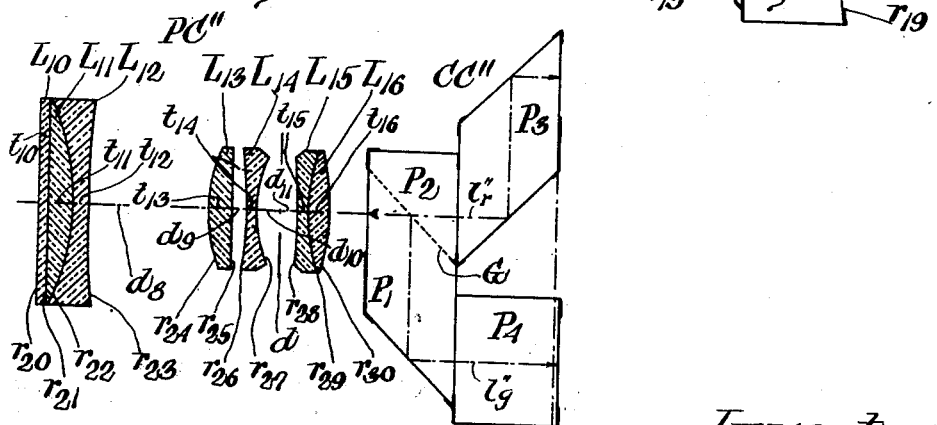
Fig. 3 is another modification of the combination comprising a further type of positive component.

$l'_x = 2.70$
$l'_r = 2.70$
$\quad\quad\quad\quad n_D = 1.5730 \quad n_{G'} = 1.5857 \quad C-F = 0.00995$
$r_{18} = +32.2''$
$r_{19} = -32.2''$ In the third embodiment of the invention, illustrated in Fig. 3, the positive lens component PC″ comprises a group of four lenses $L_{13}$, $L_{14}$, $L_{15}$, $L_{16}$, arranged with respect to each other and with respect to the diaphragm $d$ in a manner similar to that shown in Fig. 1, these lenses differing, however, in specific dimensions and spacing distances as shown by the table of data below. In addition to these four lenses the positive component PC″ comprises a forward group of lenses $L_{10}$, $L_{11}$, and $L_{12}$. The lenses $L_{11}$, $L_{12}$ form a cemented doublet having a focal length which is practically infinite and the lens $L_{10}$ comprises a flat plate of glass of uniform thickness which serves merely as a protection for the lens $L_{11}$, the latter being of such character as to require a protective covering. The lenses $L_{11}$, $L_{12}$, comprising the doublet are preferably composed of glasses whose indices differ by at least 0.09. A characteristic of this particular embodiment of the invention is that for D-light the focal lengths of the two elements of the doublet are substantially equal and the internal nodal points lie close together, thus making a substantially non-magnifying lens element.

In order to correct the axial chromatic aberration of the system to a somewhat higher degree than is otherwise attainable, the length of paths of the divided image-bearing beams may be made slightly different. Thus, as illustrated in Fig. 3, the path of the reflected beams of light passing through prisms $P_1$ and $P_4$ and being projected through a green color screen to form the green image is .004 of an inch longer than the path of the beam of light which is transmitted through the grid G passing through prisms $P_2$ and $P_3$ and thence through a red color screen to form the red image.

The specific data of the lens system shown in Fig. 3 are as follows:

*Positive component.*

$r_{20} = \pm\infty$
$\quad t_{10} = 0.075 \quad n_D = 1.5116 \quad n_{G'} = 1.5225 \quad C-F = 0.00839$
$r_{21} = \pm\infty$
$\quad t_{11} = 0.200 \quad n_D = 1.6797 \quad n_{G'} = 1.7030 \quad C-F = 0.01787$
$r_{22} = +2.150$
$\quad t_{12} = 0.135 \quad n_D = 1.5366 \quad n_{G'} = 1.5499 \quad C-F = 0.01049$
$r_{23} = -7.82$
$\quad d_8 = 1.05$
$r_{24} = +0.574$
$\quad t_{13} = .088 \quad n_D = 1.6113 \quad n_{G'} = 1.6246 \quad C-F = 0.01045$
$r_{25} = \pm\infty$
$\quad d_9 = .051$
$r_{26} = -.978$
$\quad t_{14} = 0.29 \quad n_D = 1.6046 \quad n_{G'} = 1.6225 \quad C-F = 0.01365$
$r_{27} = -0.555$
$\quad d_{10} = 0.080$
$\quad d_{11} = 0.080$
$r_{28} = -2.970$
$\quad t_{15} = .027 \quad n_D = 1.5211 \quad n_{G'} = 1.5340 \quad C-F = 0.00994$
$r_{29} = +0.673$
$\quad t_{16} = .080 \quad n_D = 1.6113 \quad n_G = 1.6251 \quad C-F = 0.01100$
$r_{30} = +0.979$
Focal length = 2.67. Aperture ratio = 1:5.5

*Composite component.*

$l''_x = 2.704$
$l''_r = 2.700$ $\quad\quad\quad\quad n_D = 1.5730 \quad n_{G'} = 1.5857 \quad C-F = 0.00995$

I claim:

1. A lens system for forming a plurality of complemental images of the same object field, comprising a positive lens component adapted to form an image-bearing beam of light containing substantial aberrations, means for dividing the image-bearing beam of light into a plurality of separate but similar image-bearing beams, and an optically dense refracting medium filling the light-dividing region and forming a continuous path in the dense medium for each separate beam throughout the light-dividing region, the optically dense refracting medium forming a composite component which, in combination with the positive component, comprises a spherically and chromatically corrected lens system.

2. A lens system for forming a plurality of complemental images of the same object field from the same point of view, comprising a positive lens component adapted to form an image-bearing beam of light containing substantial aberrations, means for dividing the image-bearing beam of light into a plurality of separate but similar image-bearing beams, reflectors in the paths of the separate beams to project the several images upon the same image plane, and an optically dense refracting medium filling the light-dividing and reflecting region and forming a continuous path for each separate beam throughout the light-dividing and reflecting region, the optically dense refracting medium forming a composite lens component which, in combination with the positive component comprises a spherically and chromatically corrected lens system.

3. A lens system for forming a plurality of complemental images of an object field from a single point of view comprising a positive lens component adapted to form an image-bearing beam of light, a grid for dividing the image-bearing beam of light into a plurality of separate but similar image-bearing beams, and a composite component comprising juxtaposed glass prisms filling the major portion of the space between the positive component and the image plane, the glass prisms wholly surrounding said grid and having reflecting surfaces in the paths of the separate beams for projecting the several images upon the same image plane, the positive lens component being corrected in such manner as to form, in combination with the composite component, spherically, chromatically, and astigmatically corrected lens system.

4. A lens system for forming a plurality of complemental images of an object field from a single point of view comprising a positive lens component adapted to form an image-bearing beam of light containing substantial aberrations, a reflecting-transmitting grid for dividing the image-bearing beam of light into a plurality of separate but similar image-bearing beams, and a composite component comprising an optically dense refracting medium filling the major portion of the space between the positive component and the image plane, the optically dense refracting medium wholly surrounding said grid and having reflecting surfaces in the paths of the separate beams for projecting the several images upon the same image plane, the positive lens component being constructed in such manner as to form, in combination with the composite component, a spherically, chromatically and astigmatically corrected lens system, the rear nodal point of the system lying within the composite component whereby the back focal length of the system is less than the thickness of the composite component.

5. A lens system for forming a plurality of complemental images of an object field from a single point of view comprising a positive lens component adapted to form an image-bearing beam of light containing substantial aberrations, a reflecting-transmitting grid for dividing the image-bearing beam of light into a plurality of separate but similar image-bearing beams, a composite component comprising juxtaposed glass prisms filling the major portion of the space between the positive component and the image plane, the glass prisms wholly surrounding said grid and having reflecting surfaces in the paths of the divided beams for projecting the several images upon the same image plane, the positive lens component being constructed in such manner as to form, in combination with the composite component, a spherically, chromatically and astigmatically corrected lens system, the back faces of the prisms being curved different degrees in the respective paths of the complemental image-bearing beams for correcting oblique chromatic aberration, and color screens positioned in the respective paths of the complemental image-bearing beams.

6. A lens system for forming a plurality of complemental images of an object field from a single point of view comprising a positive lens component adapted to form an image-bearing beam of light, means to divide the image-bearing beam of light into a plurality of image-bearing beams, and a composite component comprising an optically dense refracting medium filling the major portion of the space between the positive component and the image plane and forming a continuous path of substantially equal length for the plurality of image-bearing beams, the positive lens component being constructed to form, in combination with the composite component, an astigmatically, spherically and chromatically corrected lens system adapted to form the complemental images in such manner that they are each of the same size and similarly corrected.

7. A lens system for forming a plurality of complemental images of an object field from a single point of view comprising a positive lens component adapted to form an image-bearing beam of light, the positive lens component comprising four lenses separated by a diaphragm into two groups of two lenses each, one of said groups having a pair of facing surfaces of negative power and the other of said groups having a cemented surface of positive power, and a composite component comprising an optically dense refracting medium including means for dividing said image-bearing beam into a plurality of image-bearing beams adapted to form the complemental images, the positive lens component being corrected to form, in combination with the composite component, a spherically, chromatically and astigmatically corrected lens system.

8. A lens system for forming a plurality of complemental images of an object field from a single point of view comprising a positive lens component for forming an image-bearing beam of light, and a composite component, the latter comprising an optically dense refracting medium including means for dividing said image-bearing beam into a plurality of image-bearing beams adapted to form the complemental images, the positive lens component being under-corrected in such manner and to such extent as to form, in combination with the composite component, a spherically, chromatically and astigmatically corrected lens system.

9. A lens system for forming a plurality of complemental images of an object field from a single point of view, comprising a positive lens component for forming an image-bearing beam of light, means for dividing the image-bearing beam into a plurality of similar image-bearing beams, and a composite component for transmitting the plurality of similar image-bearing beams from the beam-dividing means to the respective image regions, the composite element comprising an optically dense transmitting medium filling the major portion of the paths of the plurality of similar image-bearing beams, the positive element being constructed and arranged alone to form an image-bearing beam of light containing substantial aberrations but being constructed and arranged in combination with the composite component to form a plurality of image-bearing beams of light containing substantially no aberrations.

10. The method of simultaneously producing a plurality of complemental images of an object field from a single point of view comprising, forming an image-bearing beam of light containing substantial aberrations, dividing the image-bearing beam into a plurality of similar image-bearing beams, passing the similar image-bearing beams through an optically dense medium, reflecting the similar image-bearing beams within the dense medium in such manner that they form complemental images substantially in a single plane, and introducing into the image-bearing beams by the passage through the dense medium aberrations adapted to counteract the aberrations in the original image-bearing beam, whereby the complemental images are spherically, chromatically and astigmatically corrected.

11. The method of simultaneously producing a plurality of spherically, chromatically and astigmatically corrected complemental images of an object field from a single point of view comprising, forming an image-bearing beam of light by means introducing aberrations thereinto, dividing the image-bearing beam into a plurality of similar image-bearing beams, passing the similar image-bearing beams through an optically dense medium to thereby increase the distance between the image-forming means and the image region and to thereby introduce into the image-bearing beams aberrations of such nature and of such extent as to counteract the aberrations introduced into the original image-bearing beams.

12. The method of producing a plurality of complemental images of an object field comprising, producing an image-bearing beam of light having substantial aberrations and dividing the image-bearing beam into a plurality of similar image-bearing beams in such manner as to introduce aberrations opposed to the former aberrations, thereby forming a plurality of spherically, chromatically and astigmatically corrected complemental images.

Signed by me at Boston, Massachusetts, this 23rd day of September, 1916.

DANIEL F. COMSTOCK.

Copies of this patent may be obtained for five cents each, by addressing the "Commissioner of Patents, Washington, D. C."